United States Patent
Sakai

(10) Patent No.: US 10,118,254 B2
(45) Date of Patent: Nov. 6, 2018

(54) MANUFACTURING METHOD FOR A SIDE BODY STRUCTURE OF A VEHICLE AND A SIDE BODY STRUCTURE OF A VEHICLE

(71) Applicant: Fuji Jukogyo Kabushiki Kaisha, Tokyo (JP)

(72) Inventor: Kensuke Sakai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 14/221,206

(22) Filed: Mar. 20, 2014

(65) Prior Publication Data
US 2014/0294489 A1    Oct. 2, 2014

(30) Foreign Application Priority Data
Mar. 27, 2013  (JP) .................................. 2013-066056

(51) Int. Cl.
*B23K 11/11* (2006.01)
*B23K 26/22* (2006.01)
(Continued)

(52) U.S. Cl.
CPC .......... *B23K 26/328* (2013.01); *B23K 11/115* (2013.01); *B23K 11/20* (2013.01); *B23K 20/1265* (2013.01); *B23K 26/22* (2013.01); *B23K 26/323* (2015.10); *B62D 25/02* (2013.01); *B62D 25/025* (2013.01); *B23K 2201/006* (2013.01); *B23K 2201/185* (2013.01); *B23K 2203/16* (2013.01); *B23K 2203/18* (2013.01); *B23K 2203/20* (2013.01); *F16B 5/08* (2013.01);
(Continued)

(58) Field of Classification Search
CPC ............ Y10T 403/477; Y10T 403/478; B23K 11/115; B23K 26/22; B23K 26/323; B23K 2201/006; B23K 2203/04; B62D 25/02; B62D 25/025; B62D 25/04; B62D 29/005
See application file for complete search history.

(56) References Cited

U.S. PATENT DOCUMENTS 3,495,321 A * 2/1970 Haren .................. B23K 20/129
                                                          228/114
4,187,407 A * 2/1980 Marko, Jr. ......... B23K 11/0026
                                                          219/91.2
(Continued)

FOREIGN PATENT DOCUMENTS

JP        S60-210374 A       10/1985
JP        2002-371546 A      12/2002

OTHER PUBLICATIONS

10 Ways to Cut Sheet Metal Waste, Jan. 9, 2012, CNC Auomatic Nexsting Software Blog, p. 1-3.*
(Continued)

*Primary Examiner* — Ryan D Kwiecinski
(74) *Attorney, Agent, or Firm* — McGinn IP Law Group, PLLC

(57) ABSTRACT

A member joining method includes the steps of forming an opening in an intermediate member composed of one part or at least two superposed parts, embedding an insert member formed of metal in the opening, placing a skin member formed of metal on an outer surface of the intermediate member such that the intermediate member is held on an inner side of the skin member, and joining the skin member to the insert member.

10 Claims, 4 Drawing Sheets

(51) Int. Cl.
  *B23K 26/32* (2014.01)
  *B62D 25/02* (2006.01)
  *B23K 11/20* (2006.01)
  *B23K 20/12* (2006.01)
  *B23K 26/323* (2014.01)
  *F16B 5/08* (2006.01)
  *B23K 101/00* (2006.01)
  *B23K 101/18* (2006.01)
  *B23K 103/16* (2006.01)
  *B23K 103/18* (2006.01)
  *B23K 103/20* (2006.01)

(52) U.S. Cl.
  CPC ...... *Y10T 29/49826* (2015.01); *Y10T 403/472* (2015.01); *Y10T 403/477* (2015.01)

(56) References Cited

U.S. PATENT DOCUMENTS

| | | | | |
|---|---|---|---|---|
| 4,932,583 A * | 6/1990 | LaCombe | | E04F 13/12 228/138 |
| 5,383,592 A * | 1/1995 | Fussnegger | | B23K 33/004 219/118 |
| 5,649,781 A * | 7/1997 | O'Boyle | | F16B 7/04 29/434 |
| 6,029,334 A * | 2/2000 | Hartley | | B21D 39/021 29/464 |
| 6,528,176 B1 * | 3/2003 | Asai | | B21D 39/021 29/521 |
| 8,056,302 B2 * | 11/2011 | Uto | | B60J 5/045 114/117 |
| 2004/0253472 A1 * | 12/2004 | Kennedy | | B23K 33/00 428/583 |
| 2006/0113450 A1 * | 6/2006 | Kilwin | | F16B 5/08 248/346.03 |
| 2007/0187371 A1 * | 8/2007 | Knaup | | B23K 11/115 219/117.1 |
| 2007/0245541 A1 * | 10/2007 | Kanaguchi | | B23K 11/115 29/557 |
| 2007/0277926 A1 * | 12/2007 | Naughton | | B29C 65/58 156/243 |
| 2010/0133877 A1 * | 6/2010 | Mori | | B23K 26/24 296/187.12 |
| 2011/0097142 A1 * | 4/2011 | Bassler | | B23K 11/0046 403/337 |
| 2013/0094896 A1 * | 4/2013 | Christ | | B23K 20/127 403/267 |
| 2013/0270229 A1 * | 10/2013 | Pedersen | | B21J 15/02 219/106 |
| 2014/0028056 A1 * | 1/2014 | Nishimura | | B62D 25/04 296/193.06 |
| 2015/0063902 A1 * | 3/2015 | Schneider | | B21D 53/88 403/266 |
| 2015/0099084 A1 * | 4/2015 | Mayr | | B29C 65/562 428/58 |
| 2015/0175207 A1 * | 6/2015 | Hata | | B23K 20/122 280/785 |
| 2015/0273620 A1 * | 10/2015 | Sakamoto | | B23K 11/20 403/179 |
| 2016/0053788 A1 * | 2/2016 | Iwano | | B29C 65/70 403/268 |
| 2016/0082542 A1 * | 3/2016 | Hiramatsu | | B23K 35/0205 403/270 |
| 2017/0089372 A1 * | 3/2017 | Fandl | | F16C 11/045 |

OTHER PUBLICATIONS

Japanese Office Action dated May 23, 2017, with an English translation thereof.

Japanese Office Action dated Nov. 23, 2016, with English translation thereof.

* cited by examiner

MANUFACTURING METHOD FOR A SIDE BODY STRUCTURE OF A VEHICLE AND A SIDE BODY STRUCTURE OF A VEHICLE

CROSS-REFERENCES TO RELATED APPLICATIONS

The present application claims priority from Japanese Patent Application No. 2013-066056 filed on Mar. 27, 2013, the entire contents of which are hereby incorporated by reference.

BACKGROUND

1. Technical Field

The present invention relates to a member joining method and a member joining structure, and more particularly, to a member joining method and a member joining structure using resistance spot welding.

2. Related Art

In a joining method and a joining structure used in an automotive body welding line, three or less sheets are normally welded in order to ensure stable quality of resistance spot welding (for example, see Japanese Unexamined Patent Application Publication No. 2012-66795). For this reason, when four or more sheets are welded, for example, a predetermined joint portion is cut out to obtain a structure for welding three sheets.

Different metal materials are often welded in a basic member joining structure, and an intermetallic compound is sometimes produced between the different metal materials. Hence, it is difficult to obtain a member joining method and a member joining structure that ensures sufficient strength. For this reason, the member joining structure actually depends on mechanical fastening such as riveting.

However, in conventional joining structures and methods, when a cutout portion is formed by cutting out a predetermined joint portion, if external force is applied by a collision or for other reasons, a trouble such as deformation originating from the cutout portion is likely to occur. For this reason, the sheet thickness and material have to be changed to avoid such trouble.

In riveting, which is a joining method, a special apparatus and rivets, which are consumer goods, are necessary. This causes new problems in the production line and cost.

SUMMARY OF THE INVENTION

It is an object of the present invention to provide a member joining method and a member joining structure that allow three or more sheets to be welded easily.

A member joining method according to an aspect of the present invention includes the steps of forming an opening in an intermediate member composed of one part or at least two superposed parts, embedding an insert member formed of metal in the opening, placing a skin member formed of metal on an outer surface of the intermediate member such that the intermediate member is held on an inner side of the skin member, and joining the skin member to the insert member.

The insert member may be formed by an offcut of the skin member.

A member joining structure according to another aspect of the present invention includes an intermediate member composed of one part or at least two superposed parts and having an opening, a skin member formed of metal and disposed on an outer surface of the intermediate member such that the intermediate member is held on an inner side of the skin member, and an insert member formed of metal and embedded in the opening.

The insert member may be formed by an offcut of the skin member.

DETAILED DESCRIPTION

An implementation of the present invention will be described in detail below with reference to the drawings.

Figure 1:
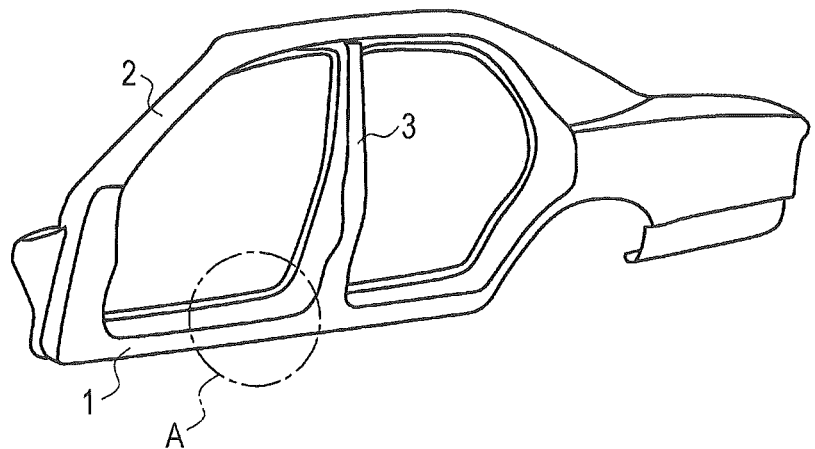
FIG. 1 is a perspective view of a side body structure of an vehicle according to an implementation of the present invention.

As illustrated in FIG. 1, a side body structure of an vehicle includes a side sill 1 serving as the skin member extending in a front-rear direction in a side part of the vehicle body, a hinge pillar 2 extending upward from a front end portion of the side sill 1, and a center pillar 3 extending upward from a center portion of the side sill 1. In the side sill 1, the hinge pillar 2, and the center pillar 3, a side sill reinforcement 5 (see FIG. 2), a hinge pillar reinforcement (not illustrated), and a center pillar reinforcement (not illustrated) are disposed, respectively, as intermediate members.

Figure 2:
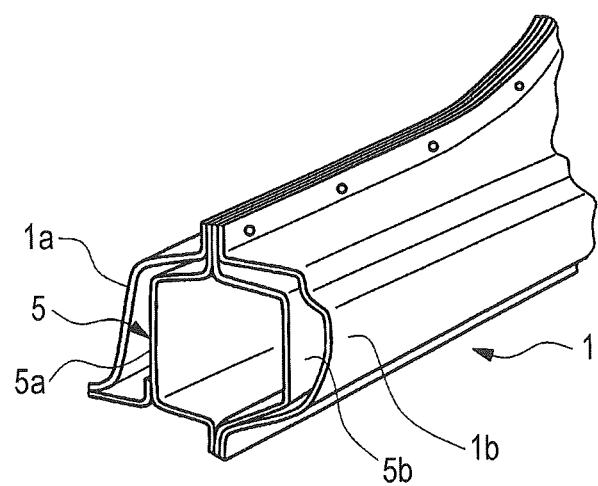
FIG. 2 is a cross-sectional view illustrating a cross-sectional structure of a section A in FIG. 1.

As illustrated in FIG. 2, the side sill 1 serving as the skin member includes a side sill inner portion 1a and a side sill outer portion 1b. The side sill reinforcement 5 disposed as the intermediate member in the side sill 1 includes an inner reinforcement 5a and an outer reinforcement 5b.

The side sill inner portion 1a and the side sill outer portion 1b are each formed by a steel sheet, whereas the inner reinforcement 5a and the outer reinforcement 5b are each formed of a high-strength lightweight material, such as either one of an aluminum alloy and a carbon fiber reinforced composite material, in order to achieve greater strength and lighter weight in the vehicle body structure.

Figure 3:
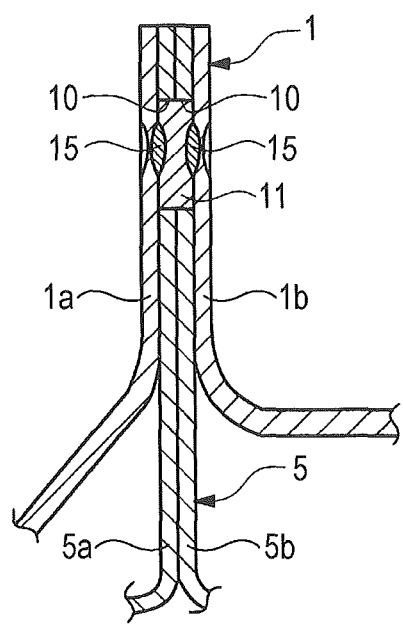
FIG. 3 is an enlarged principal cross-sectional view illustrating an example of a member joining structure.

In order to join the four members, namely, the side sill inner portion 1b, the side sill outer portion 1b, the inner reinforcement 5a, and the outer reinforcement 5b not by mechanical fastening such as riveting, but by resistance spot welding, this implementation adopts a member joining structure illustrated in FIG. 3.

In this member joining structure, the inner reinforcement 5a and the outer reinforcement 5b which are made of at least two superposed intermediate members formed of either one of metal (for example, an aluminum alloy) and non-metal (for example, a carbon fiber reinforced composite material) each have an opening 10 formed by circular holes or apertures. In the openings 10, an insert member 11 shaped like either one of a disk and coin is embedded. The insert member 11 is formed of the same metal as that of the side sill 1 serving as the skin member (for example, a steel material).

Figure 5A:
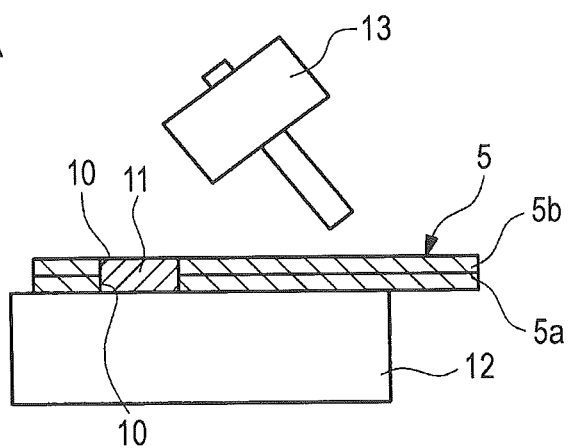
FIGS. 5A to 5C illustrate a member joining method.

Basically, it is preferable that the thickness of the insert member 11 should be equal to the sum of the thickness of the inner reinforcement 5a and the thickness of the outer reinforcement 5b in the side sill reinforcement 5. Alternatively, the thickness of the insert member 11 may be set to be slightly more than the sum of the thicknesses of the inner reinforcement 5a and the outer reinforcement 5b in the side sill reinforcement 5, and protruding portions of the insert member 11 protruding from outer surfaces of the inner reinforcement 5a and the outer reinforcement 5b may be removed by being beaten with a hammer 13, as illustrated in FIG. 5A.

If the insert member 11 is simply fitted in the circular openings 10, it may come off the opening 10. Accordingly, the outer diameter of the insert member 11 is preferably set to be slightly more than the inner diameter of the openings 10. The inner reinforcement 5a and the outer reinforcement 5b are placed one on the other on an anvil 12, as illustrated in FIG. 5A, and a single insert member 11 is driven into both the circular openings 10 of the inner and outer reinforcements 5a and 5b with the hammer 13 to apply plastic deformation force to the insert member 11. Thus, the insert member 11 is fitted and held in the openings 10 by compressive stress (see FIG. 5B).

Figure 5B:
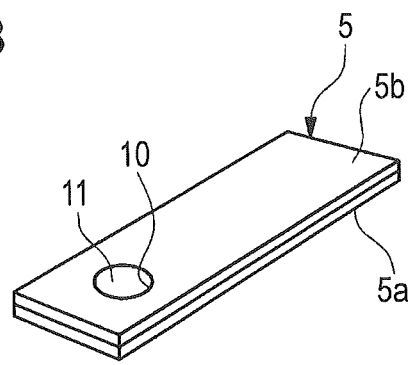
Figure 5C:
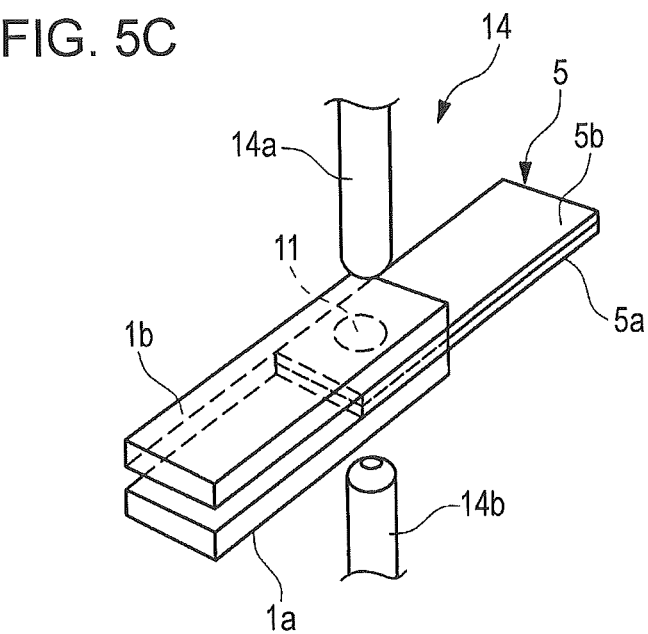

As illustrated in FIG. 5C, the side sill inner portion 1a and the side sill outer portion 1b which are formed of metal, such as steel sheets, are contacted with the outer surfaces of the inner reinforcement 5a and the outer reinforcement 5b serving as the intermediate members, respectively, such that the inner reinforcement 5a and the outer reinforcement 5b are held between the side sill inner portion 1a and the side sill outer portion 1b. Further, as illustrated in FIG. 5C, these members are placed between opposed electrodes 14a and 14b in a resistance spot welding apparatus 14, and outer surfaces of the side sill inner portion 1a and the side sill outer portion 1b are clamped between the electrodes 14a and 14b. In this state, resistance spot welding is performed by applying voltage between the electrodes 14a and 14b.

The insert member 11 is set such that the center of the insert member 11 is located on a center line between the electrodes 14a and 14b in the resistance spot welding apparatus 14, the outer surfaces of the side sill inner portion 1a and the side sill outer portion 1b are clamped between the electrodes 14a and 14b, and resistance spot welding is performed by applying high voltage between the electrodes 14a and 14b. Resistance spot welding is performed to join the side sill inner portion 1a and the side sill outer portion 1b to the insert member 11.

Thus, as illustrated in FIG. 3, the side sill inner portion 1a and the side sill outer portion 1b are fixed integrally to the insert member 11 at welded portions 15. Hence, it is possible to provide a member joining structure that allows three or more (four in the implementation) sheet members to be easily welded without forming a cutout portion.

The insert member 11 is formed by an offcut of the side sill 1. Since the offcut of the side sill 1 can thus be used as the insert member 11, it can be utilized effectively. This leads to cost reduction.

Next, a member joining method will be described. In this member joining method, first, circular openings 10 are formed in an inner reinforcement 5a and an outer reinforcement 5b of an intermediate member (side sill reinforcement) 5 that is composed of one or at least two superposed metallic or nonmetallic members (first step).

After the first step, as illustrated in FIGS. 5A and 5B, a circular insert member 11 formed of metal is driven into the circular openings 10 with a hammer 13 (second step).

After the second step, a side sill inner portion 1a and a side sill outer portion 1b, which form a metallic skin member, are placed on outer surfaces of the inner reinforcement 5a and the outer reinforcement 5b so that the intermediate member 5 is held therebetween (third step).

After the third step, the side sill inner portion 1a and the side sill outer portion 1b serving as the skin member are joined to the insert member 11 by resistance spot welding (fourth step).

According to this member joining method including the first to fourth steps, three or more (four in the implementation) sheets (members) can be easily welded without forming a cutout portion. Therefore, unlike riveting, a special apparatus and rivets which are consumer goods are unnecessary, and an existing welding apparatus can be used. Hence, an existing production line can be utilized without any change. This reduces equipment cost.

Figure 4:
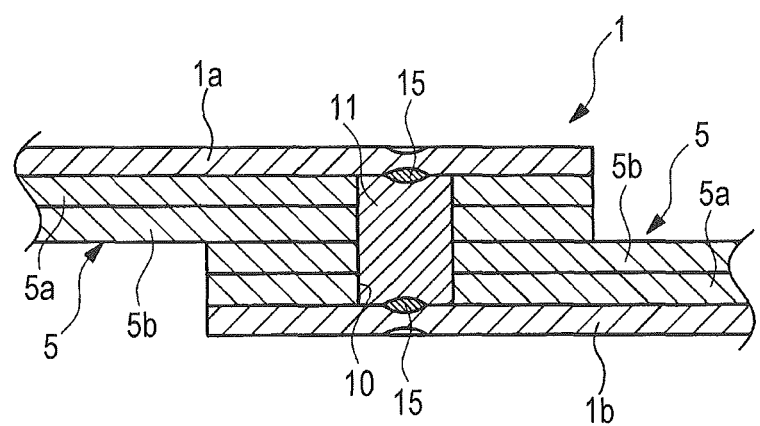
FIG. 4 is an enlarged principal cross-sectional view illustrating another example of a member joining structure.

The present invention is not limited to the above-described implementation, and various changes in design can be made within the scope of the invention. For example, while the side sill reinforcement 5 is composed of two intermediate members 5a and 5b in the implementation illustrated in FIG. 3, it may be composed of three intermediate members, or four intermediate members, as illustrated in FIG. 4. That is, the number of intermediate members is not limited. While the openings 10 are circular in the implementation, the shape of the openings 10 is not limited thereto. For example, the openings 10 may have any one of elliptical, triangular, rectangular, and polygonal shapes.

In a side sill 1 serving as the skin member in an example illustrated in FIG. 4, an inner reinforcement 5a and an outer reinforcement 5b are stacked on each of a side sill inner portion 1a and a side sill outer portion 1b, and the side sill inner portion 1a and the side sill outer portion 1b extend in opposite directions (a leftward direction and a rightward direction). In FIG. 4, components similar to those in FIG. 3 are denoted by the same reference numerals, and descriptions thereof are skipped.

Figure 6:
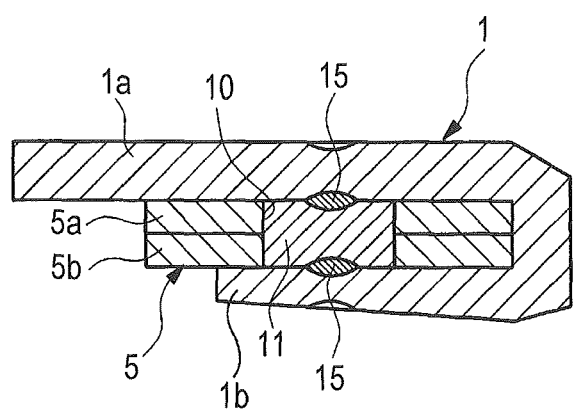
FIG. 6 is an enlarged principal cross-sectional view illustrating another example of a member joining structure.

FIG. 6 is an enlarged principal cross-sectional view illustrating another example of a member joining structure. As illustrated in FIG. 6, a side sill 1 serving as the skin member does not always need to be composed of two sheets, and a single side sill 1 may be folded back to have a U-shaped or angular U-shaped cross section such that a side sill inner portion 1a and a side sill outer portion 1b are opposed to each other.

While resistance spot welding is preferably used to join the skin member and the insert member, other joining methods, for example, either one of laser welding and friction stir welding may be used.

While the inner reinforcement 5a and the outer reinforcement 5b of the side sill reinforcement 5 are formed of a high-strength lightweight material, such as either one of an aluminum alloy and a carbon fiber reinforced composite material, in the above-described implementation, they may be formed of the same steel sheets as the side sill inner portion 1a and the side sill outer portion 1b. In this case, it is preferable to embed an insert member 11 formed by a steel sheet in openings 10 formed in the inner reinforcement 5a and the outer reinforcement 5b. That is, when multiple steel sheets are subjected to spot welding while being clamped between the electrodes 14a and 14b of the resistance spot welding apparatus 14 that are located on both outer sides of the steel sheets, an intermediate steel sheet is sometimes welded insufficiently. However, when the insert member 11 is thus buried, the occurrence of an unwelded portion can be prevented, and reliability of a welded joint portion can be enhanced.

The invention claimed is:

1. A manufacturing method for a side body structure of a vehicle comprising:
   superposing an inner reinforcement and an outer reinforcement that include any one of aluminum alloy and carbon fiber reinforced composite material so as to be defined an opening that penetrate inner reinforcement and the outer reinforcement;
   embedding an insert member formed of steel material in the opening;
   placing a side sill inner portion and a side sill outer portion oppositely to each other so that the insert member, the inner reinforcement and the outer reinforcement are disposed between the side sill inner portion and the side sill outer portion, the side sill inner portion and the side sill outer portion being formed of steel material;
   welding the side sill inner portion and the side sill outer portion to the insert member; and
   joining the inner reinforcement, the outer reinforcement, the side sill inner portion and the side sill outer portion with the side body structure of the vehicle, a reinforcement member that includes the inner reinforcement and the outer reinforcement being configured a hollow structure.

2. The manufacturing method for a side body structure of a vehicle of claim 1, wherein the embedding the insert member comprises:
   inserting a pre-embedding insert member into the opening, the pre-embedding insert member having a thickness greater than a thickness of the superposed reinforcement portions such that the pre-embedding insert member includes a protruding portion, and
   removing the protruding portion and fitting the pre-embedding insert member in the opening so as to be the insert member embedded in the opening.

3. The side body structure of a vehicle of claim 2, wherein the insert member is embedded in the opening by applying a plastic deformation force to the pre-embedding insert member such that the insert member is held in the opening by a compressive stress.

4. The manufacturing method for a side body structure of a vehicle of claim 1, wherein the embedding the insert member comprises:
   inserting a pre-embedding insert member into the opening, the pre-embedding insert member having an outer diameter greater than an inner diameter of the opening, and
   driving the pre-embedding insert member into the opening and fitting the pre-embedding insert member in the opening so as to be the insert member embedded in the opening.

5. The manufacturing method for a side body structure of a vehicle of claim 1, wherein the insert member is embedded in the opening by applying a plastic deformation force to the insert member such that the insert member is held in the opening by a compressive stress.

6. The manufacturing method for a side body structure of a vehicle of claim 1, wherein the welding the side sill inner portion and the side sill outer portion comprises joining the side sill inner portion and the side sill outer portion to the insert member by spot welding with a spot welding apparatus, and
   wherein during the welding the side sill inner portion and the side sill outer portion, the insert member is set such that a center of the insert member is located on a center line between electrodes of the spot welding apparatus,
   the method further comprising clamping the side sill inner portion and the side sill outer portion between the electrodes of the spot welding apparatus.

7. The manufacturing method for a side body structure of a vehicle of claim 1, wherein the welding the side sill inner portion and the side sill outer portion comprises joining the side sill inner portion and the side sill outer portion to the insert member by spot welding with a spot welding apparatus.

8. A side body structure of a vehicle comprising:
   a reinforcement member, of a side sill of the vehicle, comprising an inner reinforcement and an outer reinforcement superposed to the inner reinforcement, and configured a hollow structure the inner reinforcement and the outer reinforcement including any one of aluminum alloy and carbon fiber reinforced composite material; and
   a side sill member comprising a side sill inner portion and a side sill outer portion disposed oppositely to the side sill inner portion across the reinforcement member, the side sill inner portion and the side sill outer portion being formed of steel material;
   wherein the reinforcement member includes a superposed portion that the inner reinforcement and the outer reinforcement are superposed and an opening that penetrates the inner reinforcement and the outer reinforcement, and
   wherein an insert member formed of steel material is embedded in the opening, and is fixedly welded to the side sill inner portion and the side sill outer portion.

9. The side body structure of a vehicle of claim 8, wherein a thickness of the insert member is substantially equal to a thickness of a superposed reinforcement portions formed by superposing the inner reinforcement and the outer reinforcement.

10. The side body structure of a vehicle of claim 8, wherein a thickness of the insert member is equal to or greater than a thickness of a superposed reinforcement portions formed by superposing the inner reinforcement and the outer reinforcement.

* * * * *